United States Patent [19]
Sauter

[11] Patent Number: 5,245,680
[45] Date of Patent: Sep. 14, 1993

[54] GRIN LENS OPTICAL BACKPLANE WITH DUAL TRANSMITTER-RECEIVER REPEATERS

[75] Inventor: Gerald F. Sauter, Eagan, Minn.

[73] Assignee: Unisys Corporation, Blue Bell, Pa.

[21] Appl. No.: 13,874

[22] Filed: Feb. 5, 1993

[51] Int. Cl.⁵ .............................. G02B 6/28
[52] U.S. Cl. ........................ 385/24; 385/27; 385/34; 385/36; 359/163; 359/174
[58] Field of Search ............... 385/24, 33, 34, 36, 385/43, 27; 359/131, 163, 174, 179

[56] References Cited

U.S. PATENT DOCUMENTS

| | | | |
|---|---|---|---|
| 4,208,094 | 6/1980 | Tomlinson, III et al. | 350/96.20 |
| 4,239,330 | 12/1980 | Ashkin et al. | 350/96.18 |
| 4,701,011 | 10/1987 | Emkey et al. | 350/96.18 |
| 4,817,205 | 3/1989 | Asawa | 455/612 |
| 4,870,637 | 9/1989 | Follett et al. | 359/163 XR |
| 4,880,289 | 11/1989 | Imoto et al. | 385/24 XR |
| 5,050,954 | 0/1991 | Gardner et al. | 385/16 |
| 5,069,521 | 12/1991 | Hardwick | 385/24 |
| 5,083,874 | 1/1992 | Aida et al. | 359/174 XR |
| 5,136,666 | 8/1992 | Anderson et al. | 385/24 |

OTHER PUBLICATIONS

Cefarelli F. P., Evans R. T., Optical Circuit Module Connector, *IBM Technical Disclosure Bulletin*, vol. 21 No. 4, Sep. 1978.

*Primary Examiner*—John D. Lee
*Assistant Examiner*—Phan T. Heartney
*Attorney, Agent, or Firm*—Glenn W. Bowen; Mark T. Starr

[57] ABSTRACT

Dual transmitter-receiver repeaters are provided on a GRIN rod lens optical bus to boost the optical signals that are transmitted on the bus. Only one of the repeaters is operative as a repeater at a time such that when an activated repeater fails, the other repeater is activated to operate as a repeater to replace the failed one. Repeaters, in alternate embodiments, may be located together on the optical backplane, may be on adjacent cards on the electrical backplane, may be on separate cards located at opposite ends of the optical backplane, or may be located on the same card on the electrical backplane. When the repeaters are located on adjacent cards on the electrical backplane, a prism is secured to the last optical tap prism in the transmitting light path to allow the repeaters to communicate with the information processing receivers and transmitters of the optical bus. When the repeaters are located on opposite ends of the optical backplane, the intermediate optical tap prisms are each coupled to mirrors that allow both repeaters to communicate with the information processing receivers and transmitters of the optical bus.

15 Claims, 5 Drawing Sheets

GRIN LENS OPTICAL BACKPLANE WITH DUAL TRANSMITTER-RECEIVER REPEATERS

TECHNICAL FIELD

The present invention relates to optical data buses for data communication. More specifically, the invention relates to an optical backplane bus that utilizes GRIN rod lenses and beam splitters as optical taps for coupling optical signals between optical transmitting and receiving elements that are mounted on removable cards that are plugged into a backplane board wherein optical signals on the bus are enhanced by dual transmitter-receiver repeaters.

BACKGROUND ART

Information signals are commonly exchanged between circuit cards in data processing equipment and a backplane board into which transmitting and receiving elements are plugged. Conventional backplanes utilize electrical interconnections to complete the communication paths that run between the receivers and transmitters of different processors. As long as data rates are relatively low or the paths are massively parallel, electrical connections can provide satisfactory communication. However, as data rates increase, problems begin to appear due to cross-talk, skew, rf interference, losses, ground-loop isolation, impedance mismatch and latency. The exact data rate where these problems become critical varies with the application, but it often will occur at data rates between 10 MHz and 100 MHz. Between the upper and lower data rates of this range, it is possible to employ either an electrical backplane or an optical backplane for board-to-board communication links. Proposed Pi and Futurebus+ data buses are intended to operate within this range.

In order for an optical backplane to be advantageously used in place of a traditional electrical backplane, it must be competitive in cost, it must not be overly complex and it must offer future growth potential. Optical backplane designs are generally one of two types. They are of either a guided or a free-space design. The guided method may be accomplished either through optical fibers or through integrated optic waveguides. The free-space approach can be achieved either through micro-optic elements or through a holographic lens systems. Some of the general advantages and disadvantages of each method are described below.

Guided Methods. The use of optical fibers for card-to-card communications typically requires a number of expensive transmitters and receivers as well as fiber-to-fiber connections. Optical fibers must maintain alignment under all environmental conditions, including especially temperature and vibration. Arrangement of the optical fibers into a bus architecture will minimize the number of transmitters and receivers needed, but a fiber optic alignment will still be required. In addition, fiber optic bus architecture usually utilizes either a star-type configuration or a bus structure with a number of optical taps. Splitting losses on such a bus can unfavorably limit the number of cards that can be used with the bus.

Embedding optical fibers into an electrical backplane poses a compatibility problem, and often requires that the fiber optics be formed into tight turns which can damage the fibers and are difficult to implement. The use of optical fibers also often involves labor-intensive preparation and fusion or mechanical splicing of the ends of the fibers.

IBM Technical Disclosure Bulletin, Vol. 21, No. 4, September, 1978, illustrates one example of an optical circuit module connector in which fiber optics communicate with a mix of optical and electrical components that are packaged upon a conventional card-on-board environment. Light-emitting-diodes (LEDs) or photodiodes are placed on a substrate that is mounted at right angles to the circuit modules, and the optical fiber connector carries the optical fibers into alignment with the LED or photodiodes.

Integrated waveguides are another way to provide guided wave communication which have the advantages of being fabricatable by batch methods, and they are rugged and can withstand relatively high temperatures. Some integrated waveguide implementations, however, are not designed for use with bus architecture, but rather they rely on parallel data flow. For bus operation either integrated taps or star couplers that are superior to the presently available taps or couplers must still be developed to provide practical integrated waveguide bus architectures.

Integrated waveguide development has generally been directed to massively parallel computing systems in which there are a multitude of parallel interconnection paths between processors on the same card rather than to card-to-card communication. This effort has resulted in the development of low-loss polymer waveguides with cross-overs, right-angle bends and connections to transmitters or receivers. Such devices at the present time still have excessive signal losses.

Free Space. There are several approaches that utilize free-space communication between cards. One such method uses optical-to-electrical relays at each board. The signal is converted to an optical signal and is sent to an adjacent card where it is converted to an electrical signal for use at that card. If it is to be transmitted further, another electrical-to-optical conversion is made and the data is sent to the next card. The disadvantages of this system include (1) the data may be corrupted by the number of electrical-to-optical and optical-to-electrical conversions that must be made, and (2) a clear path must be maintained in the card stack for data transmission for each clear channel.

Holographic lenses have been used for diffracting a beam to a number of receivers, but this type of lens is critically dependent upon the laser frequency. A very precisely controlled signal frequency over the entire temperature range of operation is required in order for the optical transmitter to work with the holographic lens.

Graded-index (GRIN) lenses are often used to couple one single mode optical fiber to another single mode optical fiber wherein a beam is launched by one GRIN lens that passes either through free space or through a combination of free space and an intervening optical element into another GRIN lens. In some cases the two GRIN lenses have been placed so the face of one GRIN lens abuts the face of the other GRIN lens.

Examples that show the use of GRIN lens are found in U.S. Pat. No. 4,701,011, issued Oct. 20, 1987 to William Emkey, et al, entitled "Multimode Fiber-Lens Optical Coupler;" U.S. Pat. No. 4,817,205, issued Mar. 28, 1989 to Charles K. Asawa, entitled "Bimodal Optical Fiber Communication System Using Graded Index Fiber;" U.S. Pat. No. 5,050,954, issued Sep. 24, 1991, entitled "Multiport Optical Devices" to William B.

Gardner, et al; and in U.S. Pat. No. 4,239,330, entitled "Multiple Optical Switch," issued Dec. 16, 1980 to Arthur Ashkin, et al.

U.S. Pat. No. 4,208,094, issued Jun. 17, 1980, entitled "Optical Switch" in the name of Walter J. Tomlinson, III, et al., disclosed a GRIN lens and a rotator reflecting surface that was mounted adjacent to one surface of the lens at an angle. A plurality of optical fibers is positioned at the other end of the lens. Rotation of the reflecting surface about the axis of the lens changes the coupling of light between the input end and the output fibers. The output fibers are retained in alignment in a V-groove that was formed in a retaining block for the fibers.

GRIN lenses are optical glass rods which commonly have a radial refractive index gradient that approximates a parabolic function. Therefore, waves traveling through the center of the lens are the slowest, whereas waves traveling a distance displaced from the center of the lens are propagated faster in proportion to the distance that they are from the center of the lens. In GRIN lenses the light beams are alternately collimated and focused at repetitive intervals as the beam advances through the lens.

A pitch of 1 for a GRIN rod lens is defined as the distance between three successive collimating planes or three successive focus points of a given light ray. GRIN lenses that are commonly used typically have a ¼ pitch which is the distance between a collimating plane and a focus point. This means that when a focused beam is applied to one end of the GRIN lens at a focus point, a collimated output beam will be supplied at the other end of the GRIN lens at a collimating plane, and conversely when a collimated beam is applied to one end of the GRIN lens at a collimating plane, a focused output will be supplied at the opposite end of the GRIN lens at the focus point. In this manner a focused beam from one optical fiber may be expanded into a collimated beam in one GRIN lens into the second GRIN lens, where it may be converted back to a refocused beam and directed to another optical fiber to complete the communication path.

GRIN lens are manufactured in the form of elongated GRIN rod lens segments which extend for a multiple number of pitch lengths. Since the GRIN rod lens is commonly employed as a ¼-pitch element, the GRIN rod lens segments are sliced in such elements for typical applications. In the present invention the GRIN rod lens segments are used to span the distance between the optical taps of an optical bus even though a multiple number of pitch lengths may be required of the GRIN rod lens segments.

U.S. patent application Ser. No. 07/869,430, now U.S. Pat. No. 5,218,654 entitled "GRIN Rod Lens Optical Backplane Bus" was filed on Apr. 16, 1992 by the inventor of this patent application and was assigned to the assignee of this patent application. This patent application is directed to an optical backplane bus which couples optical signals to a number of receiving elements and receives optical signals from a number of transmitting elements that are contained on cards plugged into an electrical backplane. The electrical backplane in the embodiment also contains a number of GRIN lenses which have a ¼ pitch configuration and are coupled to optical fibers that supply signals to the receivers and receive signals from the transmitters.

The optical backplane bus includes a first set of transmitting GRIN rod lenses that are aligned along a first line that extends past the transmitters and receivers. A second set of receiving GRIN rod lens are positioned adjacent the first set and aligned to extend along a second line that is parallel to the first line. The receiving and transmitting GRIN rod lenses provide light paths between the optical taps which serve to direct light into the transmitting set of GRIN rod lenses from a set of transmitter coupling GRIN rod lenses and to direct light from the receiving set of GRIN rod lenses into a set of receiver coupling GRIN rod lenses.

Coupling GRIN rod lenses are located in alignment with the receivers and transmitters. Optical taps that consist of beam-splitting prisms couple transmitted optical signals from the transmitters into the transmitting path of the GRIN rod lens segments so the signals pass through the last prism of the transmitting path to a reflector. The light beam from the reflector is redirected back in the opposite direction into the GRIN rod lens set of the receiving path.

SUMMARY OF THE INVENTION

The present invention is directed to the inclusion of dual transmitter-receiver repeaters to a GRIN rod lens optical backplane bus to boost the optical signals that are transmitted on the backplane bus. The repeaters substantially reduce the optical loss of the bus and slightly decrease the dynamic range requirements of the other optical receivers of the bus. The optical backplane bus is constructed in the manner of the aforementioned U.S. patent application Ser. No. 07/869,430 now U.S. Pat. No. 5,218,654 except that the reflector that was utilized in the embodiments of this prior patent application is removed and are functionally replaced by dual transmitter-receiver repeaters. The transmitters of both repeaters are capable of boosting the intensity of the optical signals that are received by the receivers of the repeaters from the transmission path, and of providing an amplifier-boosted optical signal which is inserted back into the receiving path of the optical backplane bus. Only one of the dual transmitter-receiver repeaters, however, operates as a repeater at a time. If the operative repeater fails, the redundant repeater takes over. By employing these repeaters, the optical loss of the bus is reduced, the dynamic range requirements of the remaining optical receivers are decreased and the fault tolerance of the system is improved. Due to the use of redundant repeaters, the failure of a single repeater will not make the optical backplane bus inoperative.

BRIEF DESCRIPTION OF THE DRAWINGS

The present invention is described by reference to the drawings in which.

DESCRIPTION OF THE PREFERRED EMBODIMENTS

Figure 1:
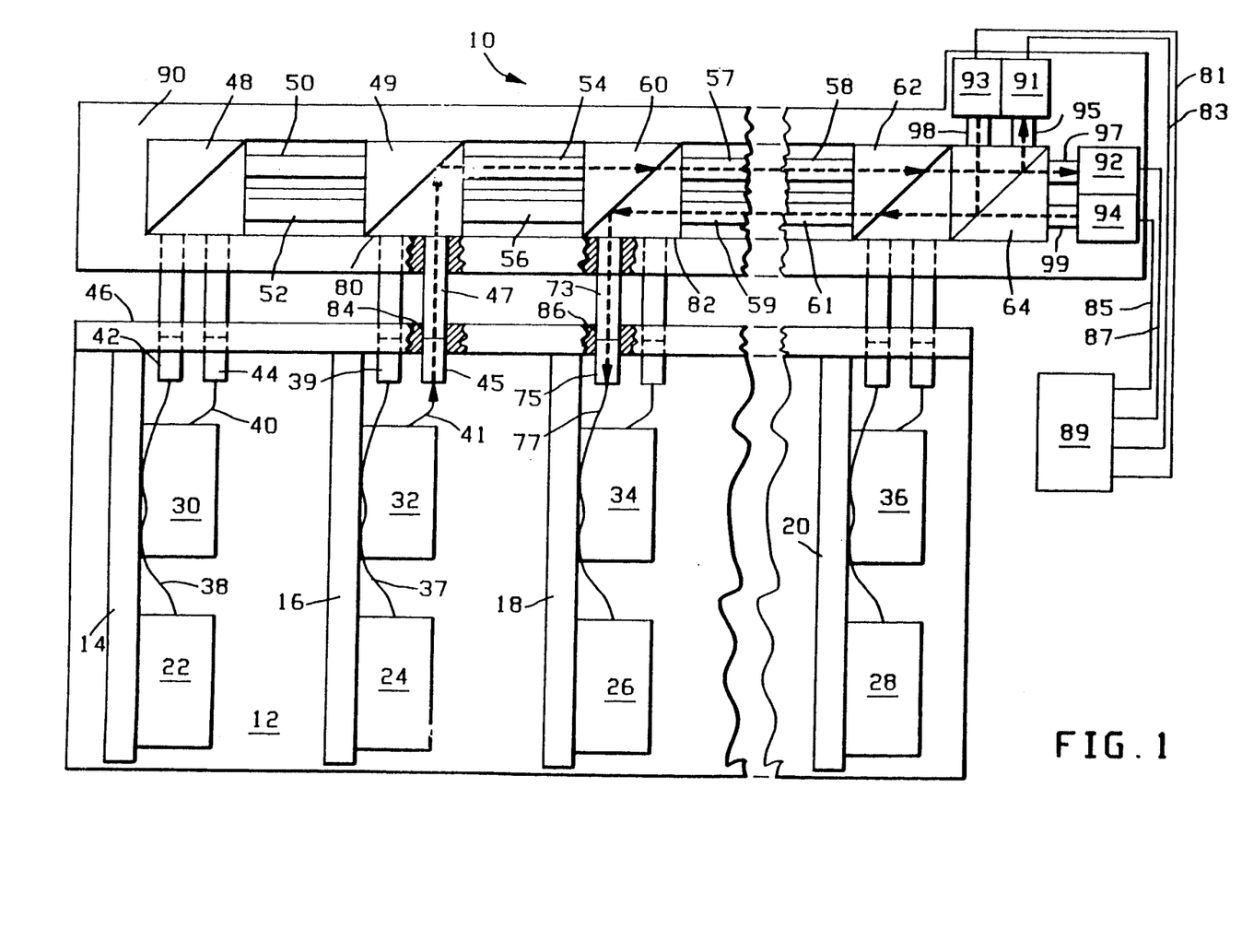
FIG. 1 is a top, partially broken view of an embodiment of the present invention in which the dual transmitter-receiver repeaters are also located on the optical backplane.

FIG. 1 shows an embodiment of the optical bus 10 of the present invention in which a large horizontally-disposed electrical circuit board 12 has a number of printed circuit cards vertically mounted on it. For illustrative purposes, four cards 14, 16, 18 and 20 are shown in FIG. 1. The Figure is broken near the right end, to indicate that additional cards and bus elements may be present. Each of the printed circuit cards contains a receiving element 22, 24, 26 and 28, respectively, and a transmitting element 30, 32, 34 and 36, respectively. The transmitters and receivers are coupled through optical fibers to GRIN rod lenses which have a pitch of ¼ and are mounted on the board 12. For example, the optical fibers 38, 40, are coupled to the GRIN lenses 42, 44, respectively. Likewise, optical fibers 37, 41 are respectively coupled to GRIN rod lenses 9, 45. The optical fiber 38 is preferably a multi-mode and the optical fiber 40 is preferably single-mode fiber. The GRIN rod lenses 42, 44, 39, 45 preferably have a pitch of 0.25.

The arrangement of the transmitters and receivers and the manner in which the GRIN lenses are coupled to the printed circuit cards, are not critical factors with respect to the present invention since many different types of arrangement and couplings are possible within the scope of the present invention. In addition, it is not essential that each GRIN lens be coupled through the optical fiber to a single transmitter since a number of optical fibers may be coupled from the GRIN lens to a number of information-processing transmitters or receivers, as shown in the aforementioned patent application Ser. No. 07/869,430 now U.S. Pat. No. 5,218,654.

The electrical backplane 46 for the bus system contains electrical wiring interconnections for the printed circuit cards 14–20 and extends in a vertical direction upwardly from the electrical circuit board 12. Aligned with each of the receiving/transmitter pair, such as the receiver 22 and the transmitter 30, are optical taps that are preferably formed by beam-splitting prisms, such as the prism 48. The GRIN rod lens segments 50, 54, 57 and 58, shown at the top line of FIG. 1, are displaced from the back of the electrical backplane 46 and provide a transmitting light path which proceeds from left-to-right, as shown in FIG. 1. The beam is sent into the transmitting light path from the transmitting units, such as the transmitter 32, its connecting optical fiber 41 and its associated GRIN lens 45.

The light beam from the GRIN lens 45 is directed into the GRIN rod lens 47, which is aligned with the GRIN lens 45. GRIN rod lenses 45, 47 and 73, 75 may be secured together by optical grade epoxy glue, if desired. The beam then travels to the right through the beam-splitter 49 which directs the signal to the right into the GRIN rod lens segment 54. The transmitted beam next passes through the beam-splitting prisms 60, 62, any intermediate prisms and to another beam-splitting prism 64.

The beam-splitting prism 64 is mounted on the optical backplane 90 as are the repeater receivers 91, 92 and the repeater transmitters 93, 94. This requires that electrical power must be supplied to the optical backplane. The prism 64 may abut the prism 62, as shown in FIG. 1, or alternately it may be coupled through GRIN rod lens in the same manner as the other prisms. The prism 64 and the receiver 91 are optically coupled through a GRIN lens 95. The receiver 92 and the prism 64 are optically coupled through the GRIN rod lens 97. The transmitter 93 and the prism 64 are optically coupled through the GRIN rod lens 98, while the transmitter 94 and the prism 64 are optically coupled through the GRIN rod lens 99.

The transmitters 93, 94 and the receivers 91, 92 of the repeaters are coupled on the lines 81–87 to the monitor and control unit 89. Only one of the repeaters which consist of the transmitter 93/receiver 91 or the transmitter 94/receiver 92 is operational at a given time. For example, if the repeater consisting of transmitter 93/receiver 91 is operating, it will continue to operate until the monitor and control unit 89 senses failure of either the transmitter 93 or the receiver 91. Upon sensing of such failure, the monitor and control unit 89 will activate the repeater consisting of the transmitter 94 and the receiver 92 to replace the failed repeater.

As shown in FIG. 1, the light from the transmitting path that passes through the prism 62 is split by the beam-splitting prism 64 so that a portion of it passes straight through into the receiver 92 which is associated with the transmitter 94, while a portion is reflected into the receiver 91 which is associated with the transmitter 93. The transmitter 94 when it is activated boosts the intensity of the light beam or optical signal from the receiver 92 and supplies the amplified light beam through the GRIN rod lens 99 to the prism 64. This optical signal passes through the prisms 64 into the receiving light path that also includes the GRIN rod lens 61. In a similar manner, the transmitter 93, when it is activated, supplies an intensity-boosted light beam which is associated with the receiver 91 through the GRIN rod lens 98 back into the prism 64. The light beam from the transmitter 93 is reflected by the beam-splitting prism 94 so that the beam now proceeds in a right-to-left manner, as viewed in FIG. 1, into a receiving light path that includes the GRIN rod lens segments 61, 59, 56, and 52 and the beam-splitting prisms 62, 60 and 48 and any intermediate prisms.

As the signal then passes through the beam-splitting prisms associated with the receivers, it is partially reflected into the receiving GRIN rod lenses, such as the GRIN rod lens 73. The GRIN rod lens 73 couples the beam to a receiving GRIN rod lens 75, and then to an optical fiber 77 and into the receiver 26. Point-to-point communication between any of the information-processing transmitters and any of the information-processing receivers along the bus can be achieved in this manner.

The length of the GRIN rod lens segments 50, 52, 54, 56, 57, 58, 59 and 61 is dependent upon the spacing between the pair of optical tap, beam-splitting prisms 49, 60 and 62 which are connected to each of these GRIN rod lens segments. These GRIN lens lengths must be m(0.5 pitch) where m is an integer. Each pair of transmitting and receiving GRIN rod lenses, such as the GRIN rod lens segments 50 and 52 between the prisms 48 and 49, are of the same length as the illustrated embodiment. The length of the GRIN rod lens segments between other prisms may be different, according to the spacing of the transmitter-receiver pairs, but preferably the transmitters and receivers will be evenly spaced from each other.

The face of each GRIN rod lens that is adjacent to a prism, such as the left face of the GRIN rod lenses 50 and 52, is preferably glued directly to the right face of the prism 48 with an optical grade epoxy which does not adversely affect the optical characteristics of the transmitting and receiving paths. A number of suitable epoxies in use are well known to those skilled in the art and are commercially available from Norland Products Inc., New Brunswick, N.J. and other manufacturers. By gluing the GRIN rod lens segments to the prisms located at their opposite ends, unwanted refections are reduced. The prisms may be encapsulated into a foam, an epoxy or plastic packing material to form a rigid structure (not shown), if desired. Material such as urethane foam and polystyrene may be used for such purpose.

The GRIN rod lenses of the transmitting and receiving paths run parallel to the electrical backplane 46, and each has a pitch of m(0.5) where m is an integer. Use of a pitch of m(0.5) for GRIN rod lenses 50, 52 insures that a collimated beam enters and leaves each of these rod lenses. This is significant because any divergence or misalignment of the beam will thereby be limited to the thickness of the beam-splitter prisms. The GRIN rod lens, such as 47 and 73, which respectively couple signals from such a transmitter 32 and to a receiver, such as receiver 26, are oriented normal to the transmitting and receiving path GRIN rod lens segments, and preferably also have a pitch of m(0.5), where m is an integer. They are also glued to the face of a beam-splitting prism, such as the faces 80, 82, respectively. With a pitch of m(0.5), a collimated beam enters into, or leaves from, the GRIN rod lenses 47, 73, respectively.

Holes are provided in the backplane, such as holes 84, 86, which allow the normal GRIN rod lenses, such as 47 and 73, to pass through the backpanel 46 and into alignment with the 0.25 pitch GRIN rod lenses 45 and 75, respectively. It is to be noted that if the GRIN rod lenses 47 and 73 had a pitch of n where n was an odd integer, the GRIN lenses 44 and 42 could be removed and the optical bus could be assembled by passing the GRIN rod lenses 47 and 73 through the rods 84, 86 and by directly coupling the GRIN rod lenses 47 and 73 to the optical fibers 41 and 77, respectively.

The prisms and GRIN rod lenses of the transmitting and receiving paths are secured in a channel 90. The channel is preferably formed of Kovar which has an expansion coefficient that closely approximates the expansion coefficient of a GRIN rod lens, and, therefore, the channel will not put excessive stress on the optical components during temperature changes.

More detailed construction and operation information on the optical backplane bus is included in U.S. patent application Ser. No. 07/869,430 (now U.S. Pat. No. 5,218,654), filed Apr. 16, 1992 and entitled "GRIN Rod Lens Optical Backplane Bus," by the inventor of this patent application. Patent application Ser. No. 07/869,430 (now U.S. Pat. No. 5,218,654) is assigned to the assignee of this patent and is hereby incorporated by reference into this patent.

Figure 2:
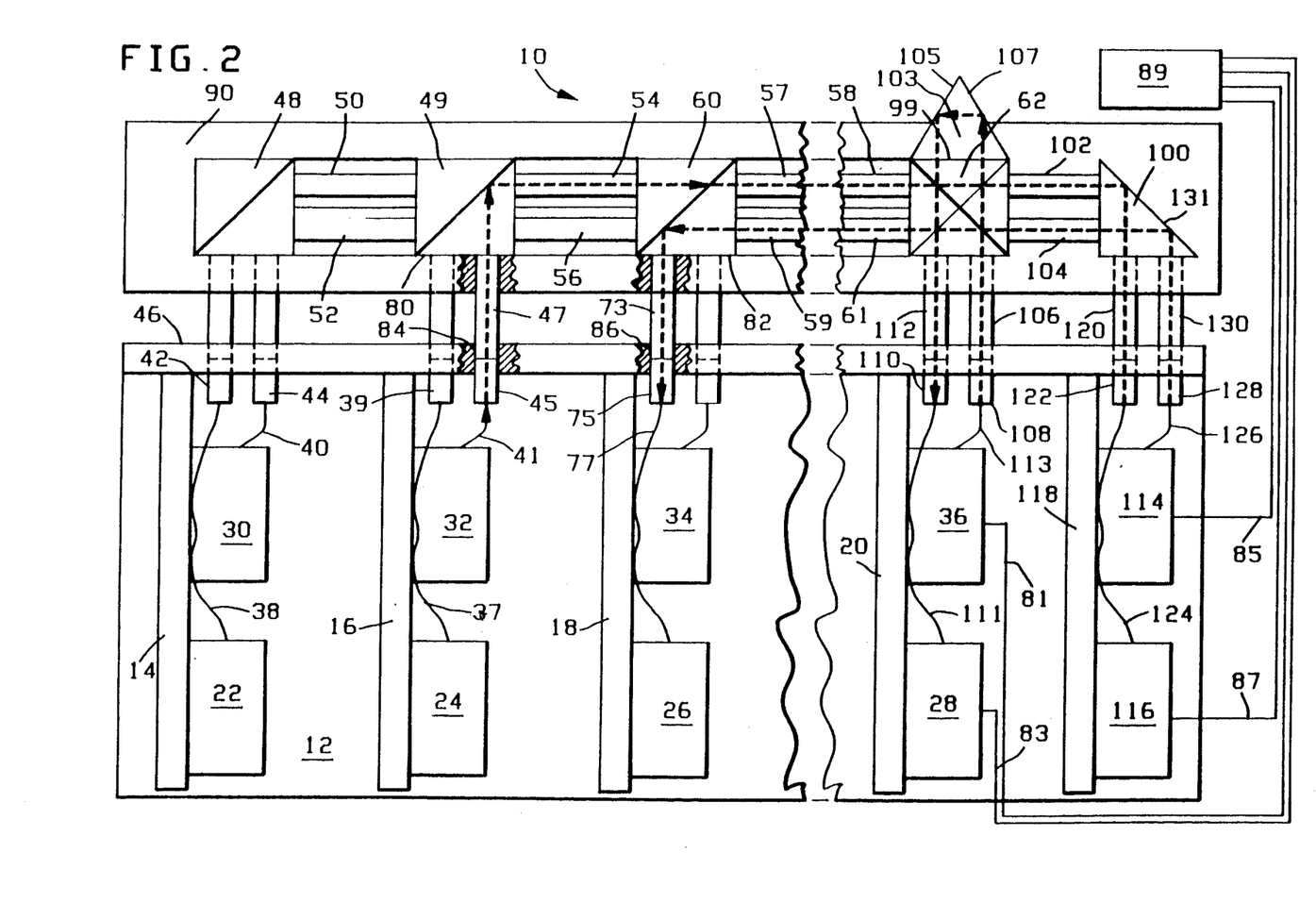
FIG. 2 is a top, partially broken view of a second embodiment in which the dual repeaters are mounted on additional cards which extend from the electrical backplane.

FIG. 2 is a second embodiment of the present invention in which prism 100 that has a triangular cross-section and a sloped reflecting face 131 is coupled through a GRIN rod lens 102 to the transmitted light beam or optical signal that passes through the beam-splitting prism 62. The prism 100 is also coupled to transmit an optical signal from the prism 100 through the GRIN rod lens 104 into the receiving path and through the optical beam splitting prism 62. The receiver 28 and the transmitter 36 which form one of the repeaters are optically coupled through GRIN rod lenses 106, 108 and 110, 112, respectively. Likewise, the receiver 116 and the transmitter 114 which form the alternate repeater are optically coupled through the GRIN rod lenses 120, 122 and 128, 130, respectively. An optical fiber 111 is coupled from GRIN rod lens 110 and an optical fiber 113 is coupled from the GRIN rod lens 108 to the receiver 28 and the transmitter 36, respectively.

The optical signal that passes through the prism 62 and the GRIN rod lens 102 is reflected by the sloped face 131 of the triangular cross-sectional prism 100 and is coupled through the GRIN rod lens segments 120, 122 to the receiver 116. The dual repeaters are both activated and deactivated by the monitor and control unit 89. The line 81 to the transmitter 36, the line 83 to the receiver 28, the line 85 to the transmitter 114 and the line 87 to the receiver 116 serve to monitor and control these respective elements. When the repeater consisting of the receiver 116 and the transmitter 114 is activated, the repeater consisting of the receiver 28 and the transmitter 36 is deactivated and vice versa. Optical signals from the transmitter 114 are coupled through the optical fiber 126, and the GRIN rod lens segments 128, 130 to the face 131 of the prism 100, where the amplified light beam is redirected back along the receiving light path through the beam-splitting prism 62.

A pyramidal-shaped prism 103 with sloped reflecting faces 105, 107 is positioned adjacent the remote face 99 of the prism 62. It is noted in FIG. 2 that the prism 62 is oriented in the opposite direction to the prisms 48, 49, 60 in order to direct the light beams in the proper directions in the transmitting and receiving light paths in order to allow this embodiment to operate. Prism 100 receives a transmitted light beam from the transmitter 36 through the GRIN rod lens 106, 108. The light beam is reflected twice off of the sloped faces 105, 107 of the prism 103 and enters the prism 62 where it is directed into the transmitting light path and the GRIN rod lens 102. The receiver 28 also can receive a light beam through the GRIN rod lens 110, 112 and the optical fiber 111. The optical prism 103, therefore, allows the transmitter 36 and the receiver 28 to communicate with the transmitter 114 and the receiver 116 so the repeater consists of the transmitter 36, and the receiver 28 can thereby serve as both an information-processing unit when the repeater on the card 118 is functioning and as a back-up repeater when the repeater on the card 118 fails. However, in this embodiment time delays and data buffering might have to be supplied in the manner known to those skilled in the art to avoid oscillation. The embodiment of FIG. 2 has advantages over that of FIG. 1 in that there is one less required repeater since the back-up repeater on the card 14 may also act as an information-processing unit. The repeater cards 14 and 118 are preferably mounted on electrical cards that are identical to the other electrical cards of the backplane.

Figure 3:
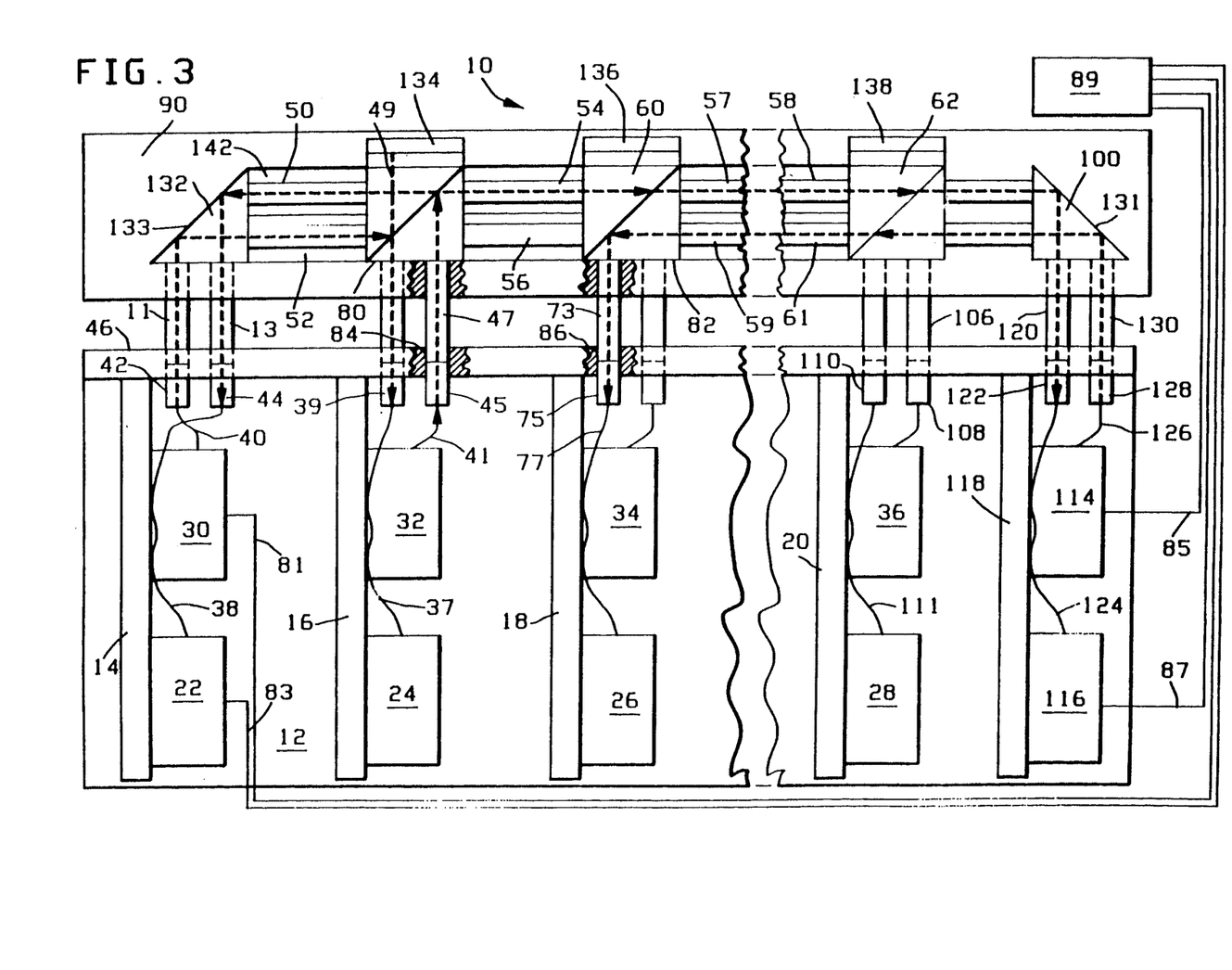
FIG. 3 is a top, partially broken view of a third embodiment of the optical backplane in which repeaters are located on opposite ends of the optical backplane bus.

In the embodiment of FIG. 3, the transmitter 30 and receiver 22 of one repeater and the transmitter 114 and receiver 116 of the other repeater are mounted on the cards 14 and 118, respectively, and are plugged into the electrical backplane at opposite ends of the optical bus. The light beam in the transmitting path passes to the right in FIG. 3 through the GRIN rod lens 102 into the prism 100 which, because of its triangular cross-sectional shape and its sloped reflecting face 131 directs the light beam through the GRIN rod lenses 120, 122 and the optical fiber 124 into the receiver 116, as previously described in conjunction with FIG. 2. The repeater that consists of the transmitter 30 and the receiver 22 are also optically coupled to a prism 132 which has a triangular-shaped cross-section and a sloped reflector face 133 that slopes in the direction opposite to that of face 131, as depicted in FIG. 3. In this embodiment, the light beam signal is coupled from the optical transmitter 30 through the optical fiber 40, and the GRIN rod lenses 42, 11 to the prism 132, and the optical receiver 22 is coupled through the GRIN rod lens 13, 44 and the optical fiber 38 to the prism 132. The optical fibers 38, 40 are cross-coupled to the GRIN rod lenses 44, 42.

When an optical light beam is transmitted by the transmitter 32 and is coupled through the optical fiber 41 and the GRIN rod lenses 45, 47 to a beam-splitting prism 49, a portion of the light beam will be reflected by the mirror 134 back toward the transmitters. Part of this light beam will pass through the prism 49 back towards the GRIN rod lens 47, and part will be refracted towards the prism 132 through the GRIN rod lens 50. This portion of the light beam will be reflected into the GRIN rod lens 13 that is coupled to the receiver 22. The mirrors 134, 136, 138, therefore, serve to feed light beams from the information-processing transmitters and receivers which could not otherwise communicate with the repeaters on the cards 14, 118. A light beam from a transmitter goes to both repeaters, so whichever one is active as a repeater will boost the power on the bus. In this embodiment as well as in the others, there will be some unwanted light beams that will be directed in a direction opposite to the desired light beam direction. However, through the utilization of techniques, designs and materials known to those skilled in the art, effective operation can be achieved.

Figure 4:
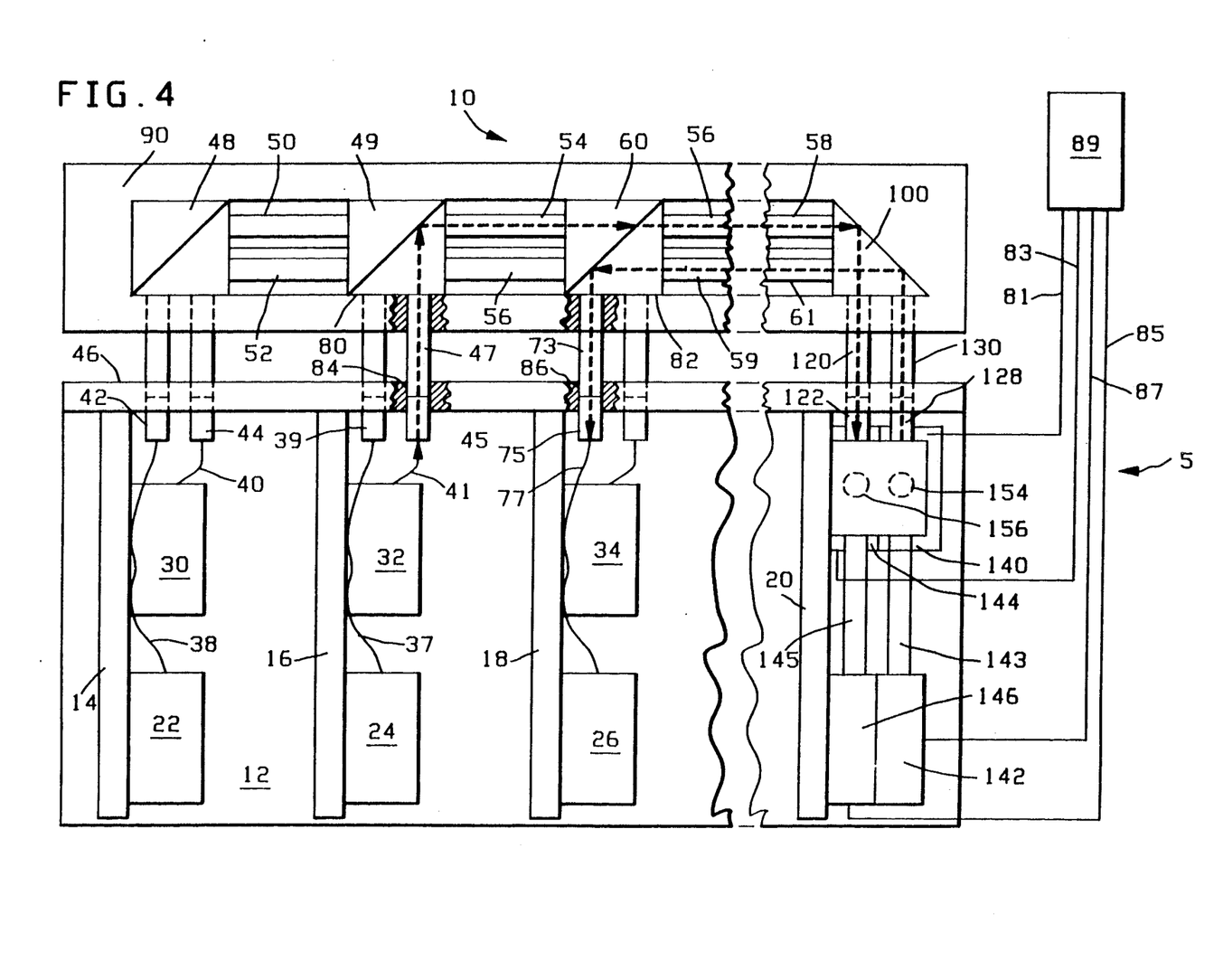
FIG. 4 is a top, partially broken view of a fourth embodiment which shows repeaters which are mounted on the same card on the electrical backplane.
Figure 5:
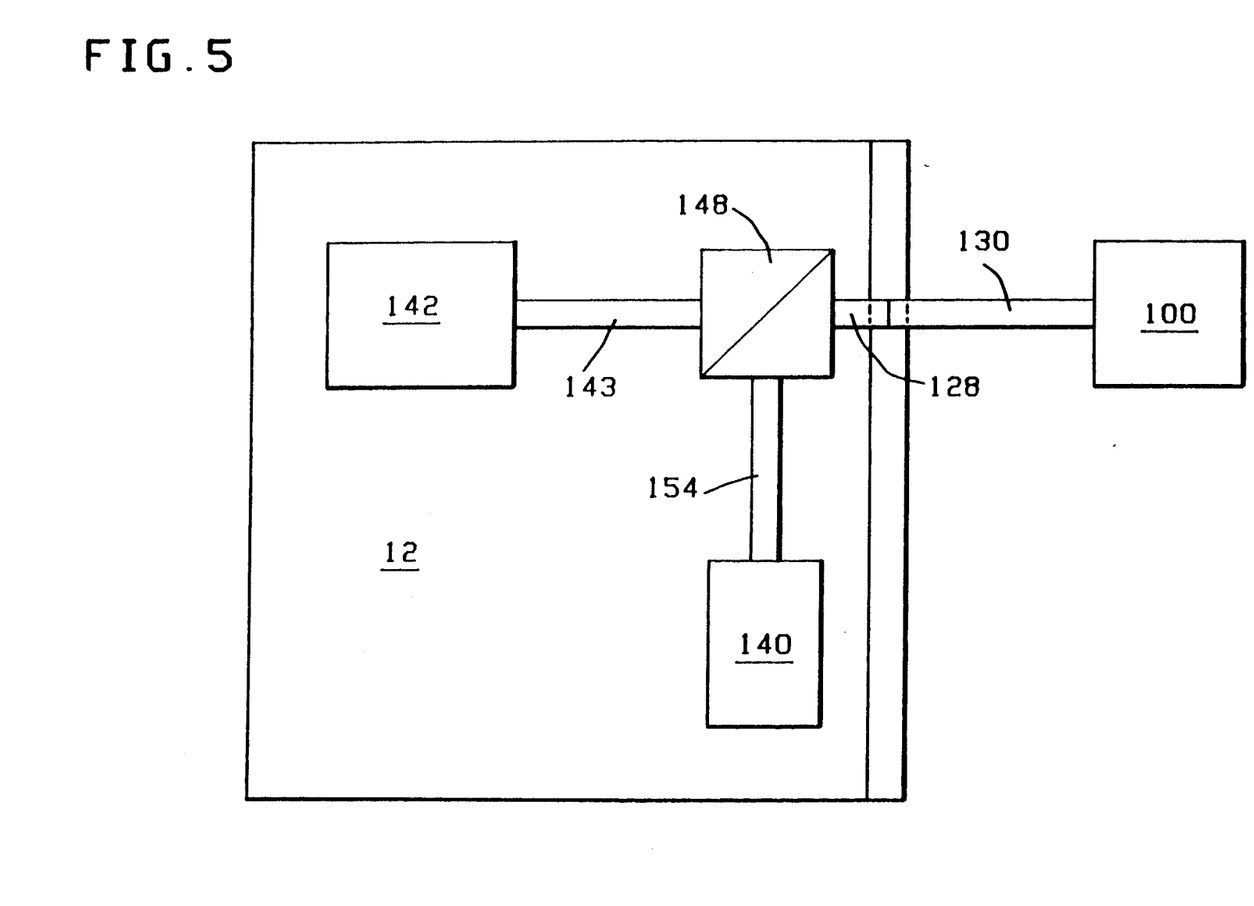
FIG. 5 is a partial side view of the embodiment of FIG. 4 which shows the card on which the repeaters are mounted on the electrical backplane, the optical coupling element and the optical prism on the optical backplane.

FIGS. 4 and 5 show a fourth embodiment of the present invention in which a single card 20 on the electrical backplane carries both of the receivers 140, 142 and the transmitters 144, 146 that are required for the two repeater units in a configuration that is similar to that of FIG. 1. The transmitter 144 and the receiver 140 are located below the beam-splitting prism 148 while the receiver 142 and its associated transmitter 146 are located forward of the prism 148, as shown in the lower portion of FIG. 4. The prism 100 is coupled to the beam-splitting prism 148 through the GRIN rod lens 120, 122 and 128, 130. The receiver 142 and the transmitter 146 are located forward of the prism 48, as viewed from the top in FIG. 3, and are optically coupled by the GRIN rod lenses 143, 145, respectively.

FIG. 5 is a partial side view of FIG. 4, as viewed in the direction of the arrow 5 of FIG. 4. The receiver 140 and the transmitter 144 of the second repeater are located below the beam-spitting prism 148 and are respectively coupled to the prism 148 through the GRIN rod lens 154, 156. The embodiment of FIGS. 4 and 5 has advantages over the embodiment of FIG. 1 in that the optical backplane does not have to be supplied electrical power, and, in addition, the repeater units may also be used as information transmitters and receivers. Of the disclosed embodiments, the embodiment of FIGS. 4, 5 is the presently preferred embodiment because alignment problems are minimized and data buffering is not required even though an additional transmitter and repeater are required.

Obviously, many modifications and variations of the present invention are possible in light of the above teachings. It is, therefore, to be understood that, within the scope of the appended claims, the invention may be practiced otherwise than as specifically described.

What is claimed is:

1. An optical bus comprising:

a plurality of beam-splitting, optical-tap means constructed to allow a light beam to travel along a transmitting light path in a first direction through said optical-tap means, to travel along a receiving light path in the direction opposite to said first direction through said optical-tap means, to allow a portion of said light beam in said receiving light path to pass into an output light path that runs in a second direction which is substantially normal to said transmitting light path, and to allow an input light path that also runs in said second direction to provide a light beam to said transmitting light path, a first plurality of GRIN rod lenses which are aligned along said transmitting light path, a second GRIN rod lenses which are aligned along said receiving light path which is substantially parallel to said transmitting light path, wherein said GRIN rod lenses of both said first and said second pluralities of GRIN rod lenses have first and second ends and each is positioned such that one of said beam-splitting, optical-tap means abuts said first end, and another of said beam-splitting optical-tap means abuts said second end of each of said GRIN rod lenses, a plurality of receiving means and a plurality of transmitting means each of which is aligned with one said beam-splitting, optical-tap means, a first set of GRIN rod lenses each of which is associated with one of said receiving means, a second set of GRIN rod lenses each of which is associated with one of said transmitting means, each of said first and second sets of GRIN rod lenses being aligned with one of said beam-splitting, optical-tap means, and being positioned in abutment with the aligned one of said beam-splitting, optical-tap means such that light beams may pass through first set of said GRIN rod lenses into said optical-tap means for transmission along said transmitting light path, and such that light may pass through optical-tap means into said receiving means through said second set of GRIN lenses, wherein said GRIN rod lenses of said first and second pluralities of said GRIN rod lenses have a pitch of m(0.5) where m is an integer, and said first and second sets of said GRIN rod lenses comprise GRIN rod lenses which have a pitch of n(0.25) where re n is equal to 3 or greater, and said optical bus further comprises, a first group of optical fiber means coupled between said transmitting means and said first set of GRIN lenses, a second group of optical fiber means coupled between said receiving means and said second set of GRIN rod lenses, and redirection means optically coupled to the last optical-tap means that is located along said transmitting path and the first beam-splitting, optical-tap means that is positioned along said receiving path is constructed to receive a light beam that has been transmitted through said last beam-splitting, optical-tap means along said transmitting light path back and to redirect said light beam through said same last beam-splitting, optical-tap means in the opposite direction into said receiving light path, the improvement wherein said redirection means comprises, first and second repeater means each comprising a transmitter and a receiver, receiving optical coupling means for coupling said receiver to receive light beams that are transmitted along said transmitting light path, and transmitting optical coupling means for coupling light beams that are transmitted from said transmitter into said receiving light path, wherein the light beam that is transmitted from said transmitter is an amplified version of the light beam that is received by the receiver of the same repeater means, and control means constructed to initially activate only one of said repeater means and to sense when said activated one of said repeater means has failed and to activate the other one of said repeater means upon the sensing of said failure of said activated one of said repeater means.

2. In an optical bus as claimed in claim 1 the improvement wherein said receiver and said transmitter of said first repeater means are optically coupled to a different portion of said optical bus means than are said receiver and said transmitter of said second repeater means.

3. In an optical bus as claimed in claim 1 the improvement comprising an optical backplane that comprises said optical tap means, said first plurality of GRIN rod lenses, said second plurality of GRIN rod lenses, and said first repeater means and said second repeater means.

4. In an optical bus as claimed in claim 3 the improvement comprising optical repeater interface means coupled to said receiving optical coupling means and to said transmitter optical coupling means to allow said first repeater means and said second repeater means to communicate with said transmitting means and said receiving means.

5. In an optical bus as claimed in claim 1 the improvement comprising an optical backplane and an electrical backplane wherein said optical backplane comprises said optical tap means, said first plurality of GRIN rod lenses and said second plurality of GRIN rod lenses, and said electrical backplane comprises said first repeater means and said second repeater means.

6. In an optical bus as claimed in claim 5 the improvement wherein said electrical backplane comprises electrical circuit cards and said first repeater means and said second repeater means are located on different adjacent ones of said electrical circuit cards.

7. In an optical bus as claimed in claim 6 the improvement comprising optical repeater interface means coupled to said receiving optical coupling means and said transmitter optical coupling means to allow said first repeater means and said second repeater means to communicate with said transmitting means and said receiving means.

8. In an optical bus as claimed in claim 7 the improvement wherein said receiving means and said transmitting means of said first repeater means are optically coupled to a different portion of said optical bus means than are said receiving means and said transmitting means of said second repeater means.

9. In an optical bus as claimed in claim 5 the improvement comprising reflection means wherein said first repeater means and said second repeater means are positioned such that all of said transmitting means and said receiving means are located on said electrical backplane intermediate said first repeater means and said second repeater means, and said reflection means is coupled to all of said optical tap means to allow said receiver and said transmitter of said first and second repeater means to communicate with said receiving means and said transmitting means.

10. In an optical bus as claimed in claim 9 the improvement wherein said receiving means and said transmitting means of said first repeater means are optically coupled to a different portion of said optical bus means than are said receiving means and said transmitting means of said second repeater means.

11. In an optical bus as claimed in claim 5 the improvement wherein said receiver and said transmitter of said first repeater means are optically coupled to a different portion of said optical bus means than are said receiver and said transmitter of said second repeater means.

12. In an optical bus as claimed in claim 11 the improvement comprising optical repeater interface means coupled to said receiving optical coupling means and to said transmitter optical coupling means to allow said first repeater means and said second repeater means to communicate with said transmitting means and said receiving means.

13. In an optical bus as claimed in claim 5 the improvement wherein said electrical backplane comprises electrical circuit cards and said first repeater means and said second repeater means are located on the same electrical circuit card.

14. In an optical bus as claimed in claim 13 the improvement comprising optical repeater interface means coupled to said receiving optical coupling means and to said transmitter optical coupling means to allow said first repeater means and said second repeater means to communicate with said transmitting means and said receiving means.

15. In an optical bus as claimed in claim 5 the improvement comprising optical repeater interface means coupled to said receiving optical coupling means and to said transmitter optical coupling means to allow said first repeater means and said second repeater means to communicate with said transmitting means and said receiving means.

* * * * *

UNITED STATES PATENT AND TRADEMARK OFFICE
CERTIFICATE OF CORRECTION

PATENT NO. : 5,245,680
DATED : September 14, 1993
INVENTOR(S) : Gerald F. Sauter It is certified that error appears in the above-identified patent and that said Letters Patent is hereby corrected as shown below:

Column 5 line 24, delete "9" and substitute -- 39 -- .

Column 10 line 19, after "second" insert -- plurality of -- .

Column 10 line 51, delete "re".

Signed and Sealed this

Twenty-ninth Day of March, 1994

Attest:

BRUCE LEHMAN

*Attesting Officer*         *Commissioner of Patents and Trademarks*